United States Patent Office 3,555,100
Patented Jan. 12, 1971

3,555,100
DECARBONYLATION OF FLUORINATED ACYL FLUORIDES
Bruce H. Garth, Newark, and William H. Gumprecht, Wilmington, Del., assignors to E. I. du Pont de Nemours and Company, Wilmington, Del., a corporation of Delaware
No Drawing. Filed Nov. 19, 1968, Ser. No. 777,170
Int. Cl. C07c *19/08, 43/00*
U.S. Cl. 260—615                    8 Claims

ABSTRACT OF THE DISCLOSURE

Process for the liquid phase decarbonylation of fluorinated acyl fluorides which comprises reacting the fluorinated acyl fluoride with antimony pentafluoride.

BACKGROUND OF THE INVENTION

(1) Field of the invention

This invention relates to the liquid phase decarbonylation of fluorinated acyl fluorides, and more particularly to such decarbonylation carried out in the presence of antimony pentafluoride.

(2) Description of the prior art

Perfluorinated, or nearly perfluorinated, organic compounds are ordinarily exceptionally chemically and thermally stable. Thus the perfluorinated alkanes and ethers find utility as plastics, lubricants, working fluids and the like.

Fluorinated carboxylic acids and polyether acids have long been sought as starting materials for preparing the stable fluorinated alkanes and ethers. However, there has been no economical means for removing the functional acid group and replacing it with a fluorine atom.

Pyrolysis has been the usual method of obtaining decarbonylation and decarboxylation. For example, Hals et al. in U.S. 2,668,864 disclose the dry pyrolysis of the sodium salts of the perfluorocarboxylic acids of the formula $C_nF_{2n+1}$COONa to yield α-perfluoroolefins. La Zerte et al. in J. Am. Chem. Soc., 75, 4525 (1953) disclose the pyrolysis of salts of perfluorocarboxylic acids in ethylene glycol to yield w-hydroperfluoroalkanes. The w-hydroperfluorocarboxylic acids of Berry U.S. 2,559,629 undergo the same reactions. Sianesi et al. in French Pat. 1,434,- 537 disclose the heating of their polyether-acyl fluorides with potassium hydroxide, thus removing carbon dioxide by a presumably similar process. The processes of pyrolysis introduce reactive functionality and are therefore undesirable in the preparation of stable materials.

Sweeney et al. in U.S. 3,018,306 disclose the decarbonylation of perfluoro-glutaryl and -butyryl chlorides and fluorides in the gaseous state with solid, particulate aluminum fluoride of a specified size at a temperature of 225° C. to 500° C., with a higher degree of recarboxylation occurring at the higher temperatures. However, the useful life of the catalyst appears to be short, and moreover, fluorinated polyethers do not appear to be adaptable to the procedure due to temperature degradation.

Selman et al. in U.S. 3,342,875 disclose the decarboxylation of the carboxylic acids obtained by hydrolysis of the acyl fluorides of Warnell U.S. 3,125,599 and of Moore et al., U.S. 3,250,808, to yield structures having the end group, —CFRH, wherein R=F and $CF_3$, respectively.

Miller in U.S. 3,242,218 discloses the process of treating the free carboxylic acids of Warnell and of Moore et al., supra, with elemental fluorine, thus replacing the carboxyl group with a fluorine atom. However, the process is cumbersome requiring hydrolysis of the acyl fluoride and, after washing and drying, treatment of the free carboxyl compound with elemental fluorine. The use of elemental fluorine is a hazardous operation and is to be avoided wherever possible.

There is, therefore, a need for simple non-hazardous process for the decarbonylation of acyl fluorides.

SUMMARY OF THE INVENTION

Process for preparing compounds of the formula RF wherein R— is selected from $F(CF_2)_w$—, $H(CF_2CF_2)_x$—, $$F(CF_2CF_2O)_yCF_2—$$

and $R'O(C_3F_6O)_zCF(CF_3)$—, wherein $w$ is an integer of 1 through 9, $x$ is an integer of 1 through 12, $y$ is an integer of 1 through 50, $z$ is an integer of 1 through 100, and $R'$ is a perfluoro alkyl group of 1 through 16 carbon atoms; which comprises reacting an acyl fluoride of the formula R—COF, wherein R is defined as above in the liquid phase with antimony pentafluoride at a temperature of from about 25° C. to about 250° C.

DESCRIPTION OF THE INVENTION

It has been found that fluorocarboxylic acid fluorides undergo decarbonylation in the liquid phase with antimony pentafluoride to produce the corresponding products in which the acyl group is replaced by a fluorine atom at a temperature of between about 25° C. to 250° C. It has been found that low-molecular-weight acyl fluorides can be reacted at about room temperature, whereas higher-molecular-weight acyl fluorides preferably are reacted at the higher temperatures in order to complete the reaction in reasonable time. The time of reaction is not critical and can range from a few minutes to a few days depending upon the yields desired; however, times of 10 to 30 hours are preferred. The products are generally separable by distillation.

The mechanism of the decarbonylation reaction of this invention is not completely understood. It appears that two competing reactions are occurring, although it is possible that one of the two may occur primarily due to the presence of impurities in the starting materials. One reaction appears to be catalytic and to involve the decomposition of a complex from which antimony pentafluoride is regenerated. The other reaction is not catalytic and appears to involve the decomposition of an antimony pentafluoride complex to produce a double bond in the organic starting material which then takes another fluorine from the antimony pentafluoride. Additionally, it appears that some antimony pentafluoride is consumed by reaction with extraneous moisture and other contaminants, e.g., solvent carried over from the preparation of the acyl fluoride reactant.

Thus it is seen that the amount of antimony pentafluoride present can vary over a wide range, viz., from catalytic amounts to stoichiometric amounts. Generally, catalytic amounts are preferred and it has been found that about forty moles or more of acyl fluoride can be decarbonylated for each mole antimony pentafluoride consumed. It appears that the catalytic reaction is favored at lower temperatures; hence, it is preferred to carry out the reaction at a temperature as low as possible within the 25° C.–250° C. temperature range, but yet at a temperature which will provide optimum yields of product within a practical time.

Ordinarily, autogenous pressures are employed; however, any pressure may be used so long as the acyl fluoride reactant remains in the liquid state.

It is advantageous to carry out the reaction under substantially anhydrous conditions in order to prevent loss of antimony pentafluoride through reaction with extraneous moisture, and to prevent the normally hydrophilic acyl fluoride reactants from being converted to their corresponding carboxylic acids. However, such conversion of the acyl fluoride is not completely deleterious to the operability of the process when the acyl fluoride is R'O(C₃F₆O)₂CF(CF₃)COF 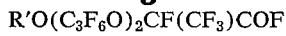

for the corresponding carboxylic acid is converted by the the antimony pentafluoride, on a stiochiometric basis, to the final product R'O(C₃H₆O)$_z$CF₂(CF₃).

It is preferred to remove the fluorinated final product of the process as soon as practicable after its formation since the polyether fluorinated products undergo some degradation in the presence of large amounts of antimony pentafluoride. The occurrance of such degradation is another reason for preferring the use of catalytic amounts of antimony pentafluoride in the reaction mixture.

EXAMPLES

In the examples which follow, products and product mixtures are characterized by infrared and/or nuclear magnetic resonance spectroscopy, and by gas chromatography.

Infrared spectroscopy methods for estimating conversion of acyl fluoride to fluorine end-capped materials are thought to be precise to about ±5% relative. Nuclear magnetic resonance, although capable of more exact determination of structure, is less precise in estimating the composition of mixtures; about ±10% relative.

Infrared analysis depends on characteristic absorption bands as follows:

Acyl fluoride—5.3μ (carbonyl)
Fluorocarbon hydride (R$_f$H)—3.3μ (C—H)
Polyhexafluoropropylene oxide 12.4μ (backbone)

Hexafluoroethane, the product of Example 1 is a known compound showing strong bands above 8.0μ.

Nuclear magnetic resonance (NMR) is in examples applied only to the analysis of polyhexafluoropropylene oxide structures.

Interpretation of these spectra is based on the following assignments in the structure, CF₃CF₂CF₂O[CF(CF₃)CF₂O]$_n$—X wherein X=

—CF(CF₃)COF (acyl fluoride) —102 p.p.m. (low field side of trifluoracetic acid)
—CF(CF₃)COOH (carboxylic acid) 54.3 p.p.m. (doublet); 56 p.p.m. (broad singlet)
—CF₂CF₃ (fluoro-end-cap) 14.7 p.p.m. (singlet); 15.2 p.p.m. (distorted triplet)

The tertiary fluorine atoms of the repeating unit produce a broad band at 67.4 p.p.m. The only —CF₂— group not attached to an oxygen atom is in the perfluoropropoxy end group. This group produces a sharp peak at 53.75 p.p.m.

The CF₃— and —CF₂O— groups of the repeating unit and of the perfluoropropoxy end group product a broad unresolved peak 10 p.p.m. to the high field side of external standard trifluoroacetic acid.

The value of $n$ is estimated by dividing the area under the 67.4 p.p.m. (tertiary fluorine) peak by one-half the area under the 53.75 p.p.m. (—CF₂— group unattached to oxygen) peak.

Gas chromatography results reported in examples were obtained in various devices. A typical method is the following. The column was two meters long and was packed with molecular weight 19,000 hydro-end-capped polyhexafluoropropylene oxide on diatomaceous earth ("Chromosorb"). The column temperature was 125° C. Helium sweep gas was used at 60 cc./min.

Example 1

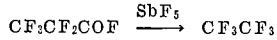
CF₃CF₂COF →[SbF₅] CF₃CF₃

In this example three sets of conditions were applied to the conversion of perfluoropropionyl fluoride to perfluoroethane. The results suggest that for perfluoropropionyl fluoride the optimum mol. ratio of SbF₅ to acyl fluoride is about 1:1 to 0.5:1 and the optimum temperature, with a view to minimizing side reactions and consumption of SbF₅, is about 90° to 125° C. Unreacted acyl fluoride is removed from the product by aqueous alkali washing.

(a) Perfluoropropionyl fluoride (16.6 g., 0.10 mol.) and antimony pentafluoride (10.4 g., 0.05 mol.) were charged to a dry, nitrogen-swept Hastelloy bomb. After shaking the tube at 125° C. for 24 hrs., gases weighing 16.0 grams were transferred to a −78° C. evacuated cylinder. Infrared analysis of the collected gases indicated essentially complete conversion to perfluoroethane. Trade amounts of hexafluoroacetone and carbon monoxide were also identified.

(b) In similar reaction, perfluoropropionyl fluoride (16.6 g., 0.10 mol.) and antimony pentafluoride (21.7 g., 0.10 mol.) were reacted 24 hrs. at 90° C. The gases weighing 14.0 grams contained, according to infrared analysis, perfluoroethane.

(c) Similarly, perfluoropropionyl fluoride (16.6 g., 0.1 mol.) and antimony pentafluoride (4.3 g., 0.02 mol.) were reacted 24 hrs. at 160° C. The collected gases (15.0 g.) included, according to infrared analysis, perfluoroethane.

Example 2

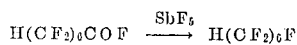
H(CF₂)₆COF →[SbF₅] H(CF₂)₆F

This example illustrates the decarbonylation of an ω-hydroperfluoroacyl fluoride. The ω-hydrogen atom was not replaced by a fluorine atom.

The course of the decarbonylation reaction was followed by infrared spectroscopy on small samples removed from the reaction mixture directly to the infrared spectrograph. Additional antimony pentafluoride was added during the course of the reaction. The overall mol. ratio of acyl fluoride and SbF₅ was 1:1.

A mixture of ω-hydroperfluoroheptanoyl fluoride (12.0 g., 0.035 mol.) and antimony pentafluoride (2.5 g., 0.012 mol.) was stirred for one hour at 25° C. in moisture protected reflux equipment. No evolution of gas was observed and infrared analysis indicated no reaction occurred. The mixture was refluxed for 20 hrs. during which the temperature fell from 104° C. to 95° C. Infrared analysis indicated partial conversion of the acyl fluoride to 1-hydroperfluorohexane.

Antimony pentafluoride (5 g., 0.023 mol.) was then added and reflux was continued for 20 hrs. during which the temperature fell to 80° C. The infrared spectrum of the reaction mixture indicated a 90% decrease in acyl fluoride carbonyl absorption and no decrease in w-hydrogen absorption. The mixture was refluxed 20 additional hours and distilled. A colorless liquid (8.9 g.) of B.P. 52–54° C. was collected. Nuclear magnetic resonance and infrared spectra were consistent with 1-hydroperfluorohexane. No acyl fluoride was found. The yield of isolated product was 87%.

Example 3

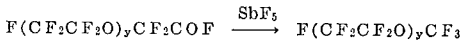
F(CF₂CF₂O)$_y$CF₂COF →[SbF₅] F(CF₂CF₂O)$_y$CF₃

This example demonstrates application of the process to acyl fluorides derived from polymerization of tetrafluoroethylene oxide. Reaction began at room temperature and a colored complex was formed.

A distillation cut of F(CF₂CF₂O)$_y$CF₂COF (32.5 g., 0.050 mol.) (molecular weight; 650, corresponding to $y$ aver.=4.6) was combined at room temperature in moisture-protected reflux equipment with antimony pentafluoride (11.0 g., 0.05 mol.). During the first half-hour, heat of reaction raised the temperature from 26° C. to 32° C. and gas was liberated. An infrared spectrum taken after one-half hour indicated that most of the acyl fluoride had been converted, presumably to a donor-acceptor complex absorbing at 1635 cm.⁻¹.

The mixture was refluxed 20 hours and upon distillation, a colorless liquid (19.7 g.) of B.P. 40° (227 mm.

Hg) was collected. The nuclear magnetic resonance spectrum was consistent with the structure, $$F(CF_2CF_2O)_{4.6}CF_3$$

The yield was 63.4%.

Example 4

$$CF_3CF_2CF_2O[CF(CF_3)CF_2O]_4CF(CF_3)COF \xrightarrow{SbF_5}$$
$$CF_3CF_2CF_2O[CF(CF_3)CF_2O]_4CF_2CF_3$$

$CF_3CF_2CF_2O[CF(CF_3)CF_2O]_nCF(CF_3COF$ (mol. wt. 4200, $n$ aver.≅23.4) (100 g., 0.024 mol.), antimony pentafluoride (5.2 g., 0.024 mol.), and carbon monoxide (in the first experiment, 2.0 g., 0.071 mol.; in the second experiment, 10.0 g., 0.357 mol.) were charged to a nitrogen-swept, chilled 400 cc. Hastelloy C bomb.

The bombs were shaken 16 hrs.; the former at 200° C.; the latter at 150° C.

Nuclear magnetic resonance examination of the product mixtures indicated complete conversion to fluorine end-capped products in both cases.

In similar experiment, $$CF_3CF_2CF_2O[CF(CF_3)CF_2O]_4CF(CF_3)COF$$

(100 g., 0.100 mol.) was heated with a lesser proportion of antimony pentafluoride (11.0 g., 0.051 mol.), and carbon monoxide (1.4 g., 0.050 mol.) at lower temperature (100° C) for 16 hrs.

The conversion to fluorine end-capped product, according to nuclear magnetic resonance, was about 87%. No acyl fluoride was found and the molecular weight was estimated by NMR at 980±10%.

Example 5

This example, in two parts, demonstrates the facile decarbonylation of the relatively low molecular weight ether-acyl fluorides and demonstrates the catalytic nature of the decarbonylation through the use of large ratios of acyl fluoride to antimony pentafluoride.

In parts (a) and (b) following, fractionally distilled $CF_3CF_2CF_2O[CF(CF_3)CF_2O]_2CF(CF_3)COF$ (part (a); 606 g., 0.913 mol., part (b); 289 g., 0.435 mol.) and redistilled antimony pentafluoride (part (a); 18.5 g., 0.085 mol., part (b); 1.9 g., 0.0088 mol.) were charged to a thoroughly dry, nitrogen filled 500 cc. 4-neck flask fitted with reflux condenser, thermometer, stirrer, and dry nitrogen inlet tube. With stirring, the mixtures, under nitrogen blanket, were heated as shown in Table I below. Small samples were removed as indicated for gas chromatographic analysis.

Mol. ratios of RCOF/SbF_5 of 29.1 and 39.8 gave intermediate results.

TABLE I

| Part | Mol. ratio RCOF/SbF_5 | Elapsed time (hrs.) | Temp. of mixture (° C.) | Gas Evolution | Area ratio RF/RCOF | Yield* (percent) | Comments |
|---|---|---|---|---|---|---|---|
| a | 10.7 | 0 | 25 | No | 0 | 0 | Addition of RCOF begun. |
|  |  | 0.10 | 79 | Yes |  |  |  |
|  |  | 0.18 | 81 | Yes |  |  |  |
|  |  | 0.43 | 98 | Yes, strong. |  |  | Addition of RCOF complete. |
|  |  | 0.60 | 108 | Strong |  |  |  |
|  |  | 0.77 | 117 | do |  |  |  |
|  |  | 0.93 | 129 | do |  |  |  |
|  |  | 1.03 | 139 | do |  |  |  |
|  |  | 1.13 | 140 | Slow | 133 | 99 |  |
| b | 49.6 | 0 | 25 | No |  |  | Addition of RCOF begun. |
|  |  |  |  |  | RC |  |  |
|  |  | 0.05 | 37 | No |  |  | Addition of RCOF complete. |
|  |  | 0.10 | 63 | No |  |  |  |
|  |  | 0.12 | 70 | Yes |  |  |  |
|  |  | 0.13 | 93 | Yes |  |  |  |
|  |  | 0.15 | 99 | Yes |  |  |  |
|  |  | 0.17 | 109 | Yes |  |  |  |
|  |  | 0.18 | 120 | Yes |  |  |  |
|  |  | 0.20 | 128 | Strong |  |  |  |
|  |  | 0.22 | 136 | do |  |  |  |
|  |  | 0.23 | 147 | do |  |  |  |
|  |  | 0.50 | 159 | Slowing |  |  |  |
|  |  | 0.97 | 156 | No |  |  |  |
|  |  | 1.27 | 156 | No | 1.05 | 52 |  |
|  |  | 1.95 | 154 | No | 1.55 | 61 |  |
|  |  | 2.21 | 153 | No | 1.74 | 63 |  |
|  |  | 3.30 | 153 | No | 2.22 | 69 |  |
|  |  | 4.27 | 153 | No | 2.81 | 74 |  |
|  |  | 20.46 | 153 | No | 4.88 | 83 |  |

*Approximate yield by gas chromatography. With credit for unreacted acyl fluoride, as would be the case in continuous process, the yield was in all cases about 100%.

The starting materials used in the process of this invention can be prepared as follows: Acyl fluorides of the structure $F(CF_2)_wCOF$ can be prepared as described in U.S. Pat. 2,567,011 or Kauch et al., Ind Eng. Chem. 43, 2332 (1951). Acyl fluorides of the structure $$H(CF_2-CF_2)_x-COF$$

can be prepared according to the procedure of U.S. Pat. 2,559,629. Reactants of the structure $$CF_3CF_2O(CF_2CF_2O)_nCF_2COF$$

can be obtained as described in U.S. Pat. 3,125,599. Acyl fluorides of the structure $R'O(C_3F_6O)_2CF(CF_3)COF$ can be prepared as described in U.S. Pat. 3,250,808; French Pat. 1,434,537; and U.S. Pat. 3,250,807.

Preferred reactants for use in the process of this invention are those of the formula $$R'O(C_3F_6O)_zCF(CF_3)COF,$$

especially ones of the structure $$CF_3CF_2CF_2O[CF(CF_3)CF_2O]_zCF(CF_3)COF$$

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing compounds of the formula RF wherein R— is $F(CF_2)_w$—, $H(CF_2CF_2)_x$—, $$F(CF_2CF_2O)_yCF_2—$$

or $R'O(C_3F_6O)_zCF(CF_3)$— wherein $w$ is an integer of 1 through 9, $x$ is an integer of 1 through 12, $y$ is an integer of 1 through 50, $z$ is an integer of 1 through 100 and $R'$ is a perfluororalkyl group of 1 through 16 carbon atoms;

which comprises reacting an acyl fluoride of the formula R—COF wherein R is defined as above in the liquid phase with antimony pentafluoride at a temperature of between about 25° C. and about 250° C.

2. The process of claim 1 carried out under autogenous pressure and substantially anhydrous conditions.

3. The process of claim 1 wherein the antimony pentafluoride is present in a catalytic amount.

4. The process of claim 3 carried out under substantially anhydrous conditions.

5. The process of claim 3 wherein the R—COF reactant is $R'O(C_3F_6O)_zCF(CF_3)$—COF.

6. The process of claim 5 wherein the R—COF reactant is $$CF_3CF_2CF_2O(CF(CF_3)CF_2O)_zCF(CF_3)—COF$$

7. The process of claim 4 wherein the R—COF reactant is $R'O(C_3F_6O)_zCF(CF_3)$—COF.

8. The process of claim 7 wherein the R—COF reactant is $$CF_3CF_2CF_2O(CF(CF_3)CF_2O)_zCF(CF_3)—COF$$

References Cited

UNITED STATES PATENTS

| | | | |
|---|---|---|---|
| 3,018,306 | 1/1962 | Sweeney | 260—653X |
| 3,242,218 | 3/1966 | Miller | 260—614FX |
| 3,342,875 | 9/1967 | Selman et al. | 260—614FUX |

HOWARD T. MARS, Primary Examiner

U.S. Cl. X.R.

260—614, 653